US 6,694,151 B2

(12) United States Patent  
Carlson

(10) Patent No.: US 6,694,151 B2  
(45) Date of Patent: Feb. 17, 2004

(54) ANTENNA APPARATUS FOR DIGITAL CAMERAS INCORPORATING WIDEBAND RF TRANSCEIVERS

(75) Inventor: Grant B. Carlson, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 408 days.

(21) Appl. No.: 09/735,107

(22) Filed: Dec. 12, 2000

(65) Prior Publication Data

US 2002/0107052 A1 Aug. 8, 2002

(51) Int. Cl.[7] ................................................. H04M 1/00
(52) U.S. Cl. ....................... 455/556; 455/272; 455/575; 348/14.02; 348/552
(58) Field of Search .......................... 455/556.1, 66, 455/575.7, 101, 272, 277.1, 277.2, 279.1; 348/14.02, 552

(56) References Cited

U.S. PATENT DOCUMENTS

| 4,696,058 | A |   | 9/1987 | Tachita et al. |
| 5,806,005 | A |   | 9/1998 | Hull et al. |
| 2002/0085087 | A1 | * | 7/2002 | Hong .................... 348/14.02 |
| 2003/0103144 | A1 | * | 6/2003 | Sesek et al. ............. 348/207.1 |

FOREIGN PATENT DOCUMENTS

| JP | 2000-174540 | 6/2000 |
| WO | WO 95/30290 | 11/1995 |
| WO | WO 96/31051 | 10/1996 |

OTHER PUBLICATIONS

Hascher, Kabel–Killer Bluetooth Geratekonzepte und Anwendunger, Elektronik, Franzis Verlag GMBH, Munchen, Germany, Apr. 2000, vol. 49, No. 7, pp. 62–65.
Internet article: Grimes, The Embedded Antenna, Net Control, Jul. 2000, p. 4.
Bursky, Miniature Embeddable Antenna Targets Bluetooth Systems, Weights on at 1g, Electronic Design, Penton Publishing, Cleveland, Ohio, vol. 47, No. 22, Oct. 1999, p. 28.

* cited by examiner

Primary Examiner—Lee Nguyen
(74) Attorney, Agent, or Firm—Thomas H. Close

(57) ABSTRACT

A digital camera having a wideband RF transceiver, includes: a graphic user interface for displaying a camera control menu, the graphic user interface having a normal viewing axis; camera grips located on opposite sides of the camera body for holding the camera to operate the transceiver while viewing the graphic user interface; and a directional antenna arranged with respect to the camera to point away from a user of the camera and having a 90±10 degree vertical beam width centered on the horizon ±20 degrees, and a 180±20 degree horizontal beam width when the camera is held by the grips for normal viewing of the graphic user interface while operating the transceiver.

7 Claims, 4 Drawing Sheets

ANTENNA APPARATUS FOR DIGITAL CAMERAS INCORPORATING WIDEBAND RF TRANSCEIVERS

FIELD OF THE INVENTION

This invention relates to digital cameras that incorporate digital wireless RF communication systems operating in a microwave band such as the 2.4 to 2.5 GHz ISM (Industrial Scientific and Medical) Band. Such communication is useful, for example, for sending digital imaging data at high data rates; e.g. rates equal and greater than 10 Mega bits per second (Mbps).

BACKGROUND OF THE INVENTION

With the advent of digital photography and file compression techniques like JPEG for still images and MPEG2 for video, the wireless transmission of digital files, for example between a transmitting device like a digital camera and a receiving device such as a personal computer or other image appliance such as a printer, has become a desirable feature. High data rate transmissions are very desirable because both digital images and streaming video represent a large amount of data (often greater than 1 MByte in size) and short transmission times are needed.

Short transmission times are needed in order to send and receive these large files quickly allowing the user freedom to do other things. At data rate speeds greater than 10 Mbps, these large files can be sent in a second or two. Short transmission times would also reduce battery power consumption for portable devices like a digital camera.

An additional desirable feature is being able to communicate at distances greater than 300 feet and also to communicate through walls. These features would enable digital cameras to communicate with utilization devices like photofinishing or multimedia equipment when the equipment is located inside a retail store, and the camera is being operated for example, inside an automobile from the parking lot of the store. Another useful feature would be for the wireless communication to be unlicensed and worldwide so that the digital camera could be taken on vacation and used in any country in the world without air time costs.

One way to send files from digital cameras without wires is through the use of radio waves. A use of radio waves to perform image communication is described in U.S. Pat. No. 5,806,005 issued Sep. 8, 1998 to Hull et al. entitled *Wireless ImageTransfer From A Digital Still Video Camera to a Networked Computer*. This patent demonstrates a potential solution of moving digital images using a cellular telephone transmitter. Unfortunately this technique has very slow data rates (i.e. 9.6 Kbps) due to the use of the cellular telephone and a large and cumbersome antenna. The cellular phone is physically too large to be incorporated into the body of the digital camera and results in a expensive system to both purchase and operate. The user of the system would not only need to purchase both the digital camera, connecting wire, and cellular phone but also pay by the minute for the air time (talk time) for using the cell phone. Worldwide use would be restricted and battery consumption would be high due to the slow 9.6 Kbps transmission rate.

One of the most important factors in determining the usefulness of the wireless system in a digital camera is in selecting the frequency band of operation. The frequency band also by way of its associated wavelength, determines size of the antenna needed. The higher the frequency of operation, the smaller the antenna needed since the wavelength of the signal is shorter. Because cameras are handheld portable devices, the overall small size of a camera is an important selling feature. Smaller invisible imbedded antennas are very desirable for appearance reasons in a digital camera. There are several radio frequency bands that could be used for such type of transmissions. One of the most attractive communication bands for such a digital communication system is the 2.4 to 2.5 GHz ISM Band since it is a microwave band with a quarter wavelength of about 1.2 inches, and that the band is unlicensed and the only band available internationally to date.

There are however, several major problems that exist with the use of this band for the wireless communication of digital images. One problem is the distortion of the antenna pattern due to human body effects. The user's hands and the closeness of the user's body to the digital camera alter the transmit and receive pattern of the antenna while holding the camera. Many types of antennas used in portable devices for operation in microwave bands are available in the marketplace today. They are typically retractable single stub monopoles, patch, F or L shaped antennas. Some recently developed antennas made of ceramic material are not much larger than the head of a pencil. While such antennas generally work well in wireless phones for instance, they all have antenna patterns with omnidirectional characteristics that do not work well when placed in a digital camera and held with both hands close to the torso of the body.

One important requirement in the wireless communication from a digital camera is the capability of the user to be able to view the Graphic User Interface (GUI) of the camera during operation. This means that the camera must transmit while being held by ones hands and while ones fingers operate the controls. In order for the transmission of the signal to be as efficient as possible, the antenna pattern should be designed in such a way as to avoid emitting energy at the human body.

Another problem with the use of the microwave band is the effect known as multipath fading on the propagation of the microwave signal. The effect of multipath fading on radio waves is a well known problem. The term multipath fading is used to describe the variations in signal strength that occur at a receiver during the time a signal is being sent. Fading occurs when a signal sent by a transmitter is reflected or blocked by a conductive medium such as a metal surface like a building, or the ground of the earth. The effects of multipath fading differ based on the physical characteristics of conductive obstructions versus the carrier frequency of the radio communication system, and the type of modulation technique employed. In general, the effects of multipath fading are greater at higher frequencies because the phenomenon of diffraction is slowed. One problem with using microwave bands is that the effect of multipath fading is also increased due to signal reflections and absorption by small objects and also by the human body.

To reduce or avoid the effect of multipath fading, communication equipment has traditionally used methods like diversity. Diversity refers to a level of redundancy or duplication in order to achieve an improvement in performance under multipath fading conditions. Space or antenna diversity refers to the use of two or more antennas. Frequency diversity refers to the changing of carrier frequencies in order to avoid the multipath fading.

Antenna diversity is well know and taught in several patents. In U.S. Pat. No. 4,696,058 issued Sep. 22, 1987 to Tachita et al. entitled *Diversity Receiver*, a diversity receiver uses more than one antenna and a means to switch to the one antenna with the greatest signal strength. In International Patent No. WO 95/30290 published Nov. 9, 1995, entitled Method for Transmitting Messages in Multipath Propagation Using Space and Time Diversity by Sandler et al., the patent teaches a solution using two transmit antennas with appropriate separation greater than ½ wavelength to create sufficient spatial diversity to assure that the propagated signal can be received without experiencing a destructive fade. The problem with antenna diversity is that there is often not enough room for the two properly spaced antennas to fit within the body of a consumer digital camera.

Other techniques for reducing the effects of multipath fading are spread spectrum modulation techniques like frequency hopping and direct sequence. But these two techniques add considerable size, weight and cost to RF systems also making them too difficult to incorporate into a consumer digital camera.

Accordingly, there is a need for an antenna apparatus for digital cameras that incorporates wireless RF transceivers for communicating digital images and an improved means of transmission and reception when operating in microwave bands in the presence of signal absorption and multipath fading and the effects of the human body.

SUMMARY OF THE INVENTION

The need is met according to the present invention by providing a digital camera having a wideband RF transceiver, including: a graphic user interface for displaying a camera control menu, the graphic user interface having a normal viewing axis; camera grips located on opposite sides of the camera body for holding the camera to operate the transceiver while viewing the graphic user interface; and a directional antenna arranged with respect to the camera to point away from a user of the camera and having a 90±10 degree vertical beam width centered on the horizon ±20 degrees, and a 180±20 degree horizontal beam width when the camera is held by the grips for normal viewing of the graphic user interface while operating the transceiver.

ADVANTAGES

The camer, according to the present invention, has the advantages that the hands and body of the camera user do not affect the communications of the camera. The camera can achieve a high data communication rate and the antenna has a small size due to the high frequency of operation of the transceiver. The camera has the additional advantage that communication is optimized when the camera is held in the intended position for viewing the graphic user interface.

DETAILED DESCRIPTION OF THE INVENTION

Figure 1:
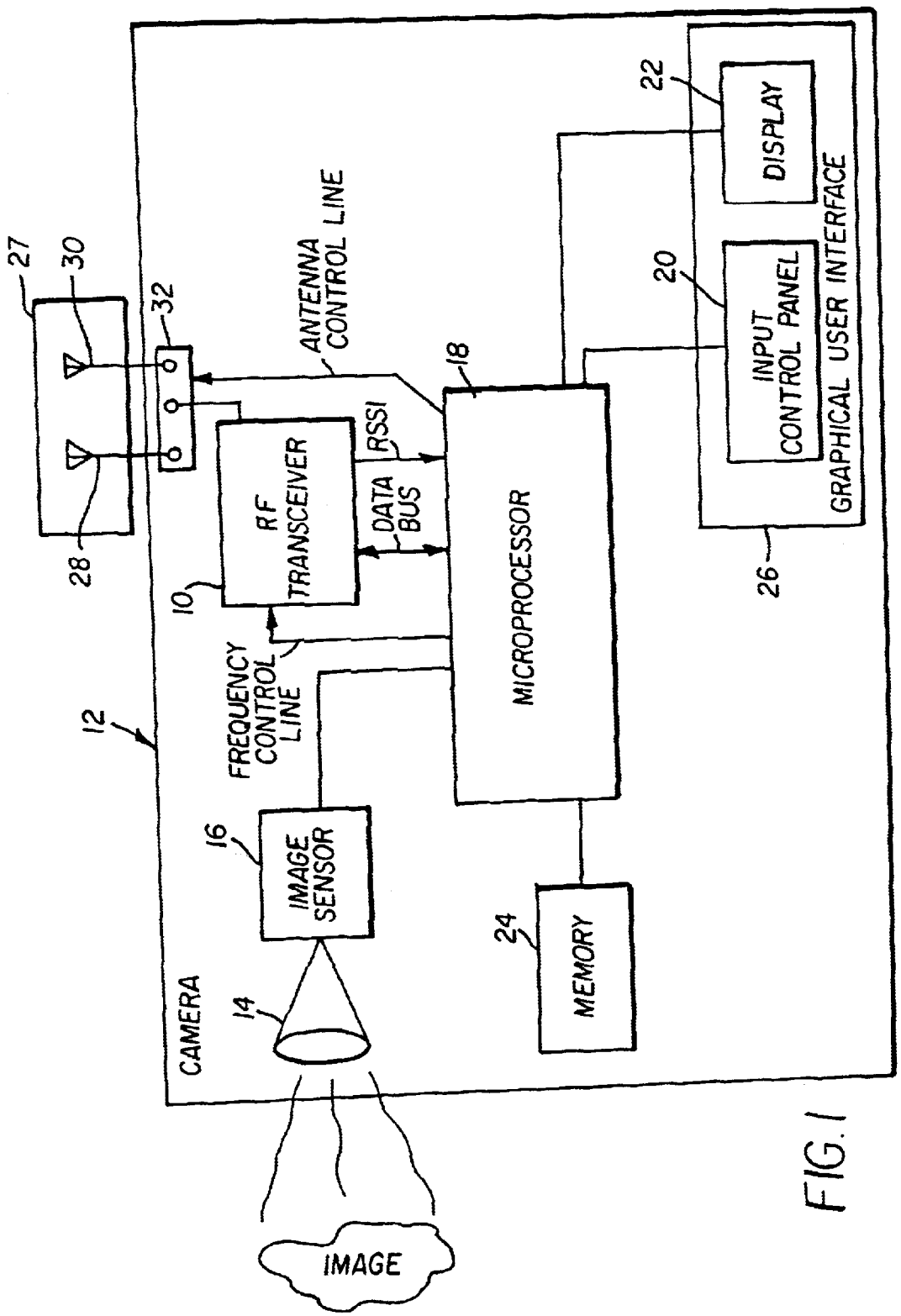
FIG. 1 is a schematic block diagram of a camera having a transceiver employed with antenna apparatus according to the present invention.

Referring to FIG. 1, a typical wideband transceiver 10 in a digital camera 12 useful with an antenna arrangement of the present invention is shown. As used herein, the term wideband means any RF transceiver capable of communication data rates of 10 megabits per second or faster. The camera 12 includes a lens 14 and an image sensor 16. The overall operation of the camera 12 is controlled by a microprocessor 18, which receives control inputs from a control panel 20, displays control instructions and images on a display 22, and manages images stored in a camera memory 24. The display 22 and control panel 20 together comprise a graphical user interface (GUI) 26. The display 22 and control panel 20 can be integrated as a touch screen. An antenna array 27 including a pair of directional antennas 28 and 30 are connected to the transceiver 10 through an antenna switch 32.

The transceiver 10 is controlled by the microprocessor 18 to transmit and receive digital image files and other information to and from other cameras and communication devices in the neighborhood of the camera 12. The antenna switch 32 is under control of the microprocessor 18 and can switch between directional antennas 28 and 30. The microprocessor 18 receives an RSSI (received signal strength indicator) signal from the transceiver and periodically switches back and forth (e.g. every few seconds) between the antennas to determine which provides the strongest RSSI signal. This provides spatial diversity to the transceiver. Alternatively, the microprocessor can monitor the rate of packet errors and switch between the antennas to minimize the packet error rate.

In one possible mode of operation, the microprocessor 18 periodically signals the RF transceiver 10 via a frequency control line to change the carrier frequency of the RF transceiver 10, monitors a received signal strength indicator (RSSI) signal from the transceiver, and selects the carrier frequency that provides the strongest signal to the transceiver to provide frequency diversity to the wideband RF transceiver.

Figure 2:
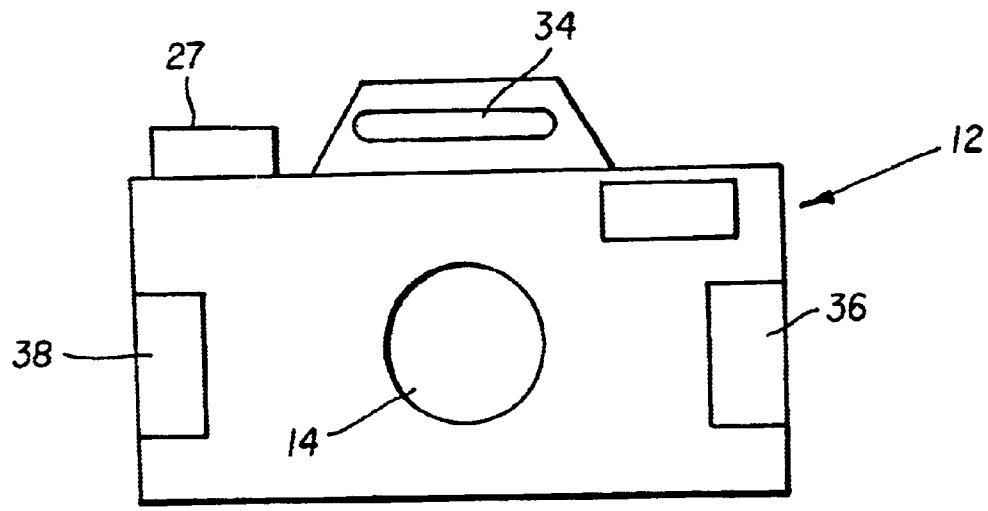
FIG. 2 is a front view of a camera having an antenna according to the present invention.

Referring to FIG. 2, the camera 12 may include a flash lamp 34 and a pair of grips 36 and 38 located on either side of lens 14. The camera grips 36 and 38 are located on opposite sides of the camera body for holding the camera to operate the transceiver while a camera user 40 (see FIG. 3) views the graphic user interface 26. The antenna array 27 is located for example on one side of the flash mechanism 34 where it is not covered by a user's hands on the hand grips.

Figure 3:
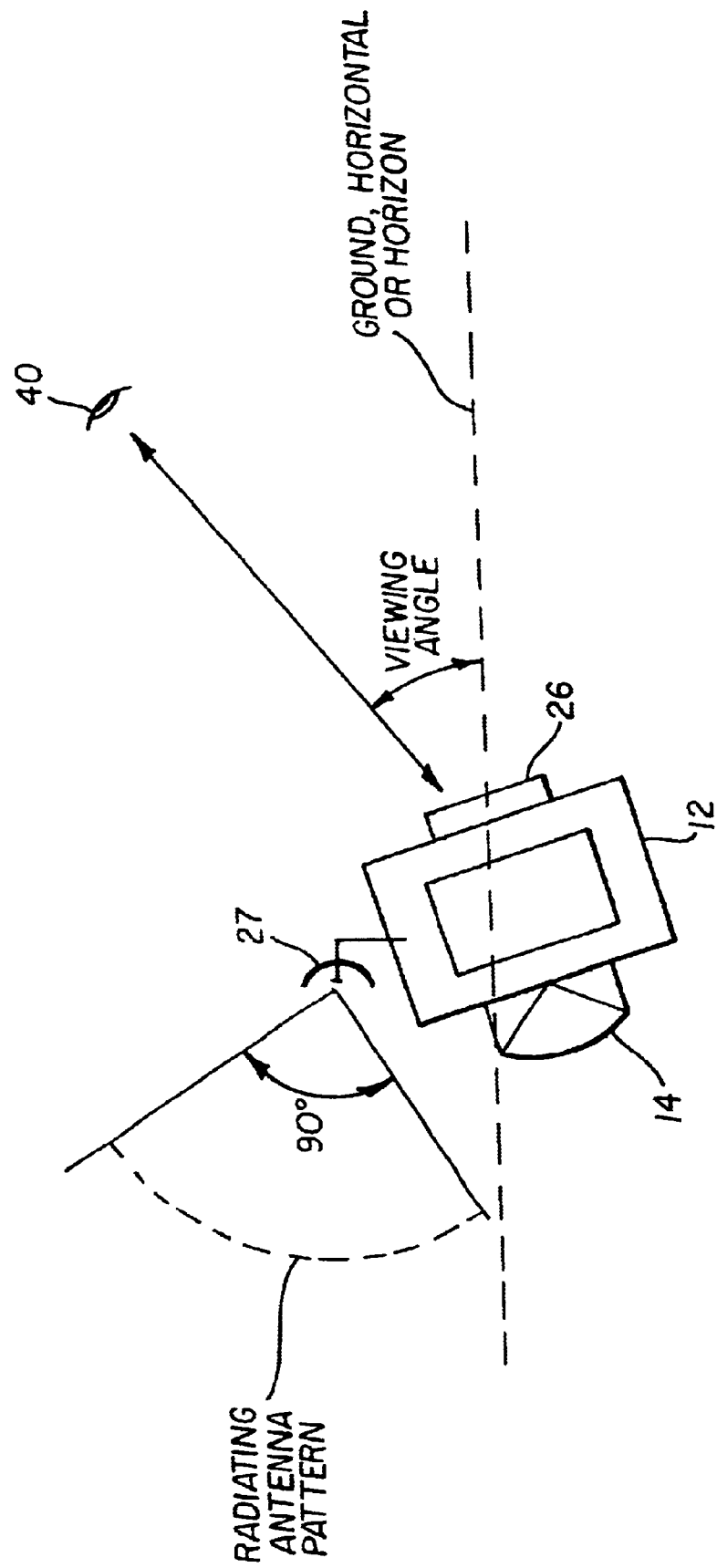
FIG. 3 is a side view of the camera shown in FIG. 2.

Turning now to FIG. 3, the location and direction of the directional antenna array 27 on the camera 12 according to the present invention will be described. The directional antenna array 27 is arranged with respect to the camera to point away from a user of the camera and having a 90±10 degree vertical beam width centered on the horizon ±20 degrees, and a 180±20 degree horizontal beam width when the camera is held by the grips 36 and 38 for normal viewing of the graphic user interface 26 while operating the transceiver 10.

Figure 4:
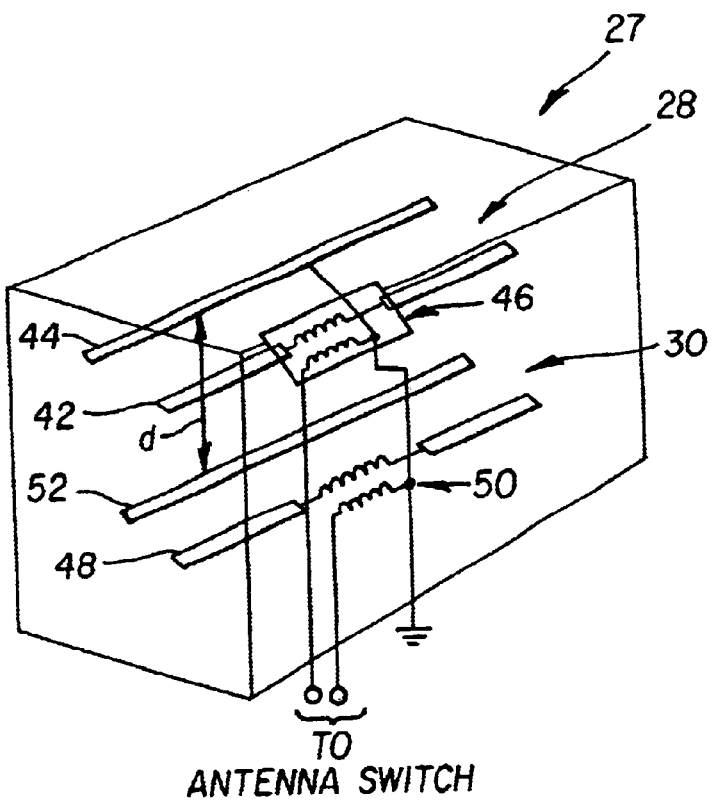
FIG. 4 is perspective view of one possible embodiment of an antenna array useful with the present invention.

Referring to FIG. 4, one embodiment of an antenna array 27 according to the present invention includes a first antenna 28 having a radiating element 42 and a reflecting element 44. The elements would typically be one half wavelength or less long, e.g. about 6 cm or less for the 2.45 GHz band. The radiating element 42 is coupled to the transceiver by a balanced to unbalanced transformer (balun) 46, and the reflecting element 44 is connected to ground. The second antenna 30 located a distance d, for example one quarter wavelength from the first antenna, includes a radiating element 48 coupled to the transceiver by a balun 50, and a reflecting element 52. The first and second antennas may be constructed from discrete elements and encapsulated in a block of plastic and mounted outside the body of a metal bodied camera. Alternatively, the antenna array may be formed by printing the antenna elements on a printed circuit board and the printed circuit board mounted inside a plastic bodied camera. The antenna elements could also be formed in the body of a plastic bodied camera as shown in FIG. 5.

Figure 5:
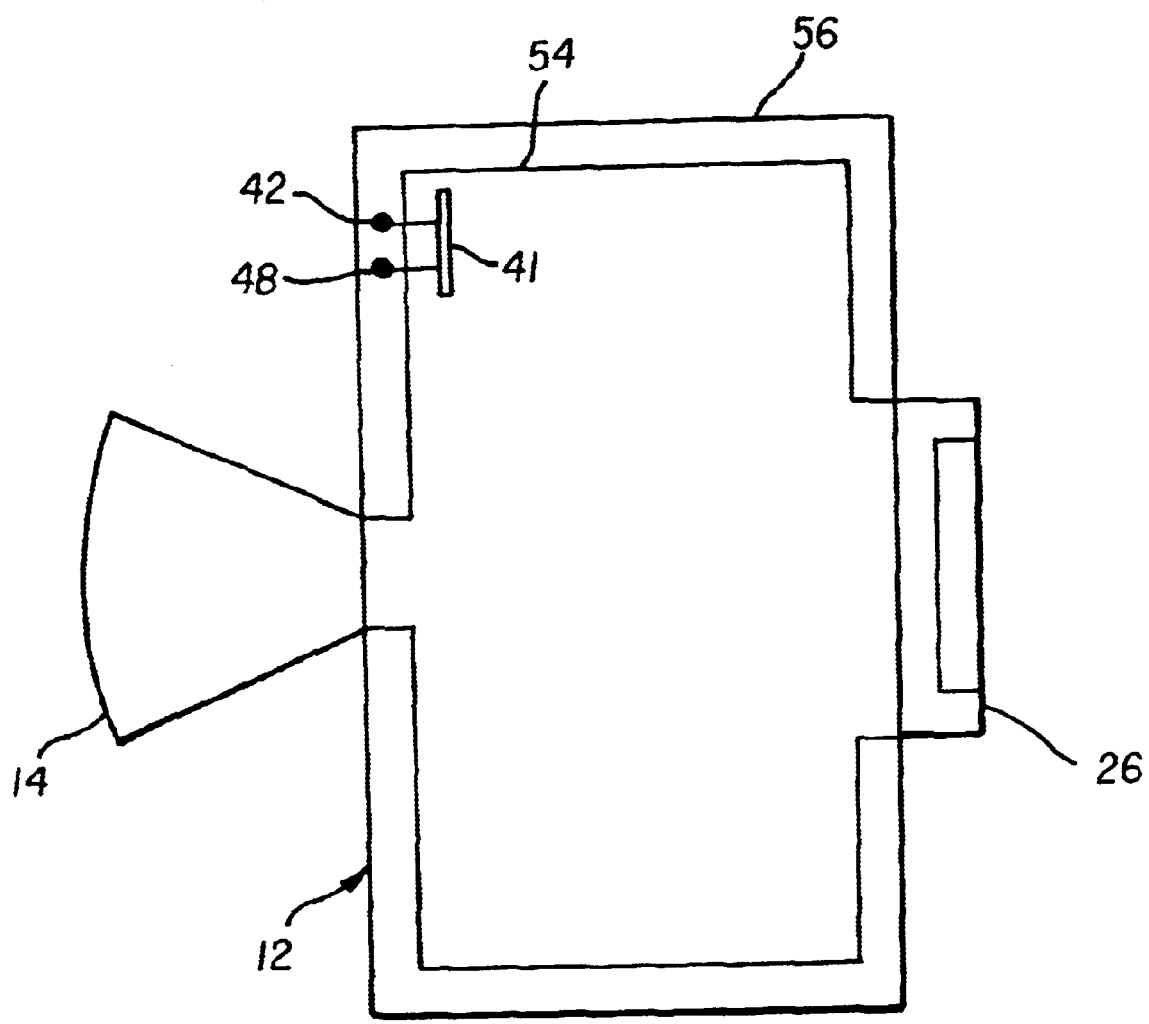
FIG. 5 is a side view of a camera wherein the body of the camera is used as a reflector for the antenna array.

FIG. 5 shows a side view of the camera 12 with lens 14 and GUI 26. The antenna elements 42 and 48 are shown imbedded in the plastic case or outer enclosure of the camera body 56. The antenna elements are connected to the antenna switch 32 (not shown) which is located on the RF transceiver Printed Circuit Board (PCB) 41. The plastic case or outer enclosure 56 of the camera is lined with a conductive surface like a conductive paint or metal film to form a Faraday cage 54 about the electronics of the digital camera. Such conductive surfaces are most always used in electronic products to prevent the emissions of electromagnetic radiation. The Faraday cage 54 can as shown also be used as the reflector for the radiating elements to form a directional antenna array. The radiating elements could easily be modeled into the plastic outer case of the camera body. Small wires or a connector could be used to connect the radiating elements 42 and 48 to the RF transceiver PCB 41.

Alternatively, where the camera has a metal body, the antenna elements 42 and 48 can be encapsulated in a nonconductive material and mounted on the outside of the metal body, the metal body being used as an antenna reflector.

The invention has been described in detail with particular reference to certain preferred embodiments thereof, but it will be understood that variations and modifications can be effected within the spirit and scope of the invention.

PARTS LIST

| | |
|---|---|
| 10 | transceiver |
| 12 | camera |
| 14 | lens |
| 16 | sensor |
| 18 | microprocessor |
| 20 | control panel |
| 22 | display |
| 24 | memory |
| 26 | GUI |
| 27 | antenna array |
| 28 | directional antenna |
| 30 | directional antenna |
| 32 | antenna switch |
| 34 | flash lamp |
| 36 | grip |
| 38 | grip |
| 40 | user |
| 41 | RF XCVR PCB |
| 42 | radiating element |
| 44 | reflecting element |
| 46 | balun |
| 48 | radiating element |
| 50 | balun |
| 52 | reflecting element |
| 54 | Faraday cage |
| 56 | plastic case (enclosure) |

What is claimed is:

1. A digital camera having a wideband RF transceiver, comprising:

a) a graphic user interface for displaying a camera control menu, the graphic user interface having a normal viewing axis;

b) camera grips located on opposite sides of the camera body for holding the camera to operate the transceiver while viewing the graphic user interface; and c) a directional antenna arranged with respect to the camera to point away from a user of the camera and having a 90±110 degree vertical beam width centered on the horizon ±20 degrees, and a 180±20 degree horizontal beam width when the camera is held by the grips for normal viewing of the graphic user interface while operating the transceiver.

2. The digital camera claimed in claim 1, further comprising:

a) a second antenna;

b) an antenna switch for selectively connecting the first or second antenna to the RF transceiver; and c) a control circuit connected to the RF transceiver and the antenna switch for receiving a received signal strength indicator (RSSI) signal from the transceiver and controlling the antenna switch to connect the antenna that provides the strongest signal to the transceiver to provide spatial diversity to the RF transceiver.

3. The digital camera claimed in claim 1, wherein the antenna is connected to the transceiver and located on the top of the camera adjacent the transceiver in a location where it is not covered by a user's hands on the hand grips.

4. The digital camera claimed in claim 1, further comprising:

means for changing the carrier frequency of the wideband RF transceiver and a received signal strength indicator (RSSI) signal from the transceiver and selecting the carrier frequency that provides the strongest signal to the transceiver to provide frequency diversity to the wideband RF transceiver.

5. The digital camera claimed in claim 1 further comprising a camera body that functions as a reflector for the directional antenna.

6. The digital camera claimed in claim 5, wherein the camera body is metal.

7. The digital camera claimed in claim 5, wherein the camera body is plastic lined with an electrically conductive coating.

* * * * *